United States Patent
Gila et al.

(10) Patent No.: US 6,943,725 B2
(45) Date of Patent: Sep. 13, 2005

(54) ACCESS CONTROL SYSTEM WITH LIMITED EVALUATION OF CODE AND DISTANCE INFORMATION

(75) Inventors: Janos Gila, Mödling (AT); Wolfgang Konrad, Mödling (AT)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/793,720

(22) Filed: Mar. 5, 2004

(65) Prior Publication Data

US 2004/0189511 A1 Sep. 30, 2004

(30) Foreign Application Priority Data

Mar. 7, 2003 (DE) ......................................... 103 10 158

(51) Int. Cl.⁷ .............................................. G01S 13/76
(52) U.S. Cl. .............................. 342/42; 342/44; 342/51; 340/5.2
(58) Field of Search ....................... 342/42–51; 340/5.2, 340/5.7, 5.72, 825.36, 825.49

(56) References Cited

U.S. PATENT DOCUMENTS

| | | | | |
|---|---|---|---|---|
| 4,160,875 A | * | 7/1979 | Kahn ........................... | 380/253 |
| 4,725,841 A | * | 2/1988 | Nysen et al. .................. | 342/44 |
| 4,918,458 A | * | 4/1990 | Brunner et al. ............... | 343/795 |
| 5,649,296 A | * | 7/1997 | MacLellan et al. ............ | 455/39 |
| 2002/0008615 A1 | | 1/2002 | Heide et al. .................. | 340/426 |
| 2004/0189511 A1 | * | 9/2004 | Gila et al. ..................... | 342/42 |

FOREIGN PATENT DOCUMENTS

| | | | | |
|---|---|---|---|---|
| DE | 195 39 939 A1 | 4/1997 | ............ | H04B/1/04 |
| DE | 197 54 720 C2 | 12/2000 | ............ | G01S/13/34 |
| DE | 199 57 536 A1 | 6/2001 | ............ | B60R/25/00 |
| DE | 100 54 180 A1 | 5/2002 | ............ | G01S/13/74 |
| DE | 100 64 141 A1 | 7/2002 | ............ | E05B/47/00 |

OTHER PUBLICATIONS

"Implementation of reconfigurable transceiver based on digital IF for multiple wideband CDMA signals", Jae Ho Jung; Kwang Chun Lee; Deuk Soo Lyu; Vehicular Technology Conf., VTC 2003–Spring. The 57th IEEE Semiannual vol. 4, Apr. 22–25, 2003 P(s):2842–2846.*

* cited by examiner

*Primary Examiner*—John B. Sotomayor
(74) *Attorney, Agent, or Firm*—Baker Botts L.L.P.

(57) ABSTRACT

An access control system for an object, particularly a motor vehicle, comprises at least one base station with a transceiver device that transmits a wideband modulated interrogation signal, at least one transponder that has a modulation device, in order to modulate an auxiliary carrier signal, the frequency of which is changed between an infinite number of frequency positions, onto an interrogation signal received at a distance from the base station and reflect it as a code-modulated response signal, and an evaluation device that is connected after the transceiver device and that evaluates the response signal in sidebands of the changed frequency positions, with respect code and distance.

20 Claims, 2 Drawing Sheets

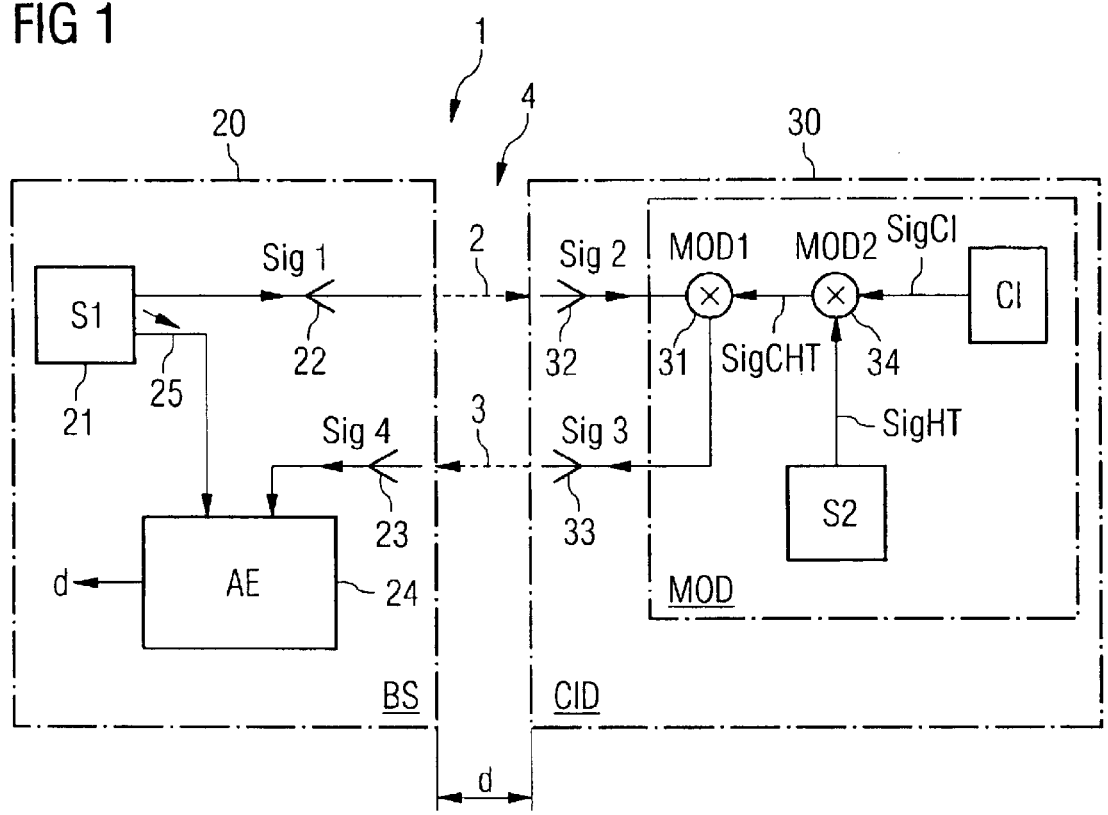

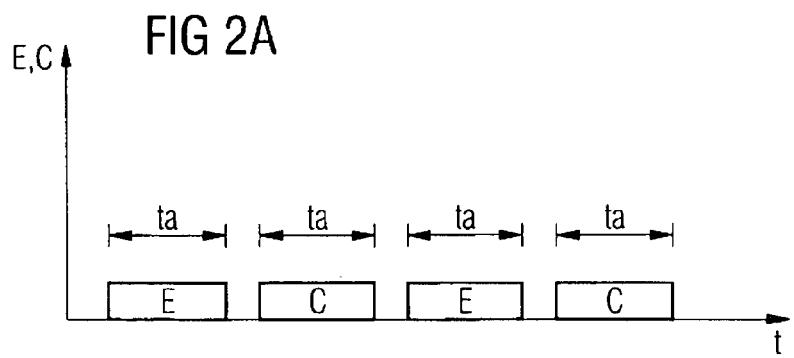
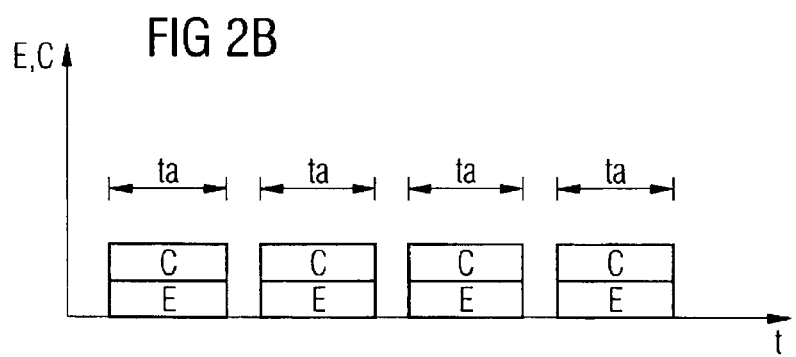
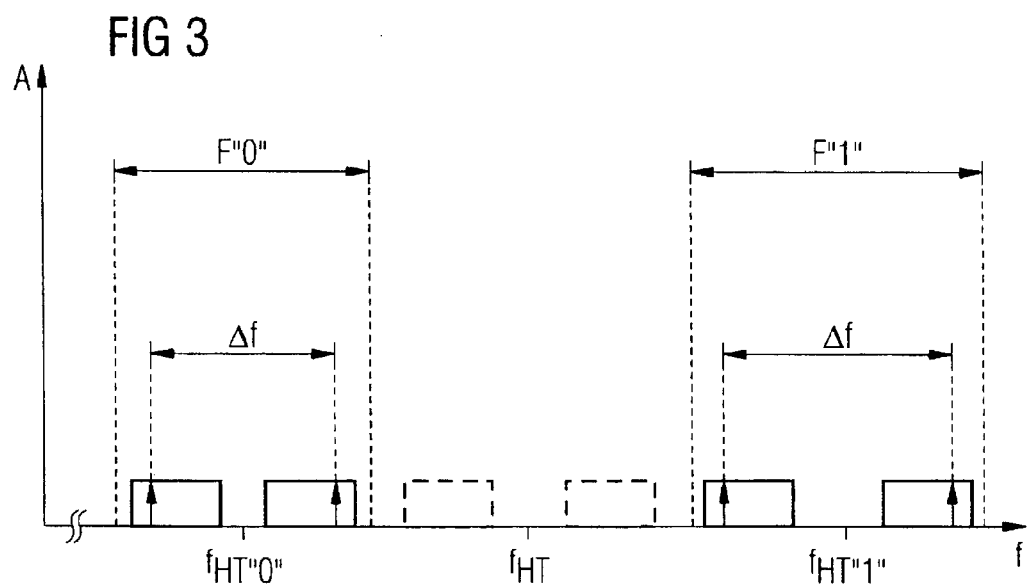

ACCESS CONTROL SYSTEM WITH LIMITED EVALUATION OF CODE AND DISTANCE INFORMATION

PRIORITY

This application claims priority to German application no. 103 10 158.6 filed Mar. 7, 2003.

1. Technecal Field of the Invention

The invention relates to an access control system for an object, particularly a vehicle, and a method for operating an access control system by means of which an authorization for access to, or use of, a vehicle can be checked.

2. Description of the Related Art

In automotive engineering, mechanical locking systems are being increasingly replaced by electronic access control systems that offer a high degree of operator comfort. Depending on whether the vehicle driver has to manually initiate an action to actuate an access function or whether this takes place automatically by the system, a basic distinction is made between active and passive access control systems. Both systems consist of one or more base stations fitted in the vehicle, whose task it is to detect the authorization of a vehicle driver by means of the identification sensor carried by the driver and to afford the driver the easiest possible access to the vehicle. Detection takes place by means of remote identification, with the identity of a portable identification transmitter being checked by means of a radio dialog. This identification sensor, also known as a radio key or CD transmitter, is referred to in the following as a code transmitter or transponder. A transponder (transmitter-responder) is part of a Radio Frequency Identification System (RFID). It can be set up in such a way that if it receives a suitable interrogation signal from a reading device it transmits a high-frequency response signal. This response signal contains code information that is allocated to the transponder or to the object to be identified. The identity check can take place in the reading device, for example by comparison with stored set code information. If there is agreement, the access control system generates an enable signal that controls an access function to the object. This access function can, for example, be the unlocking of the central locking system of the vehicle. Modern passive access control systems, "Passive Start and Entry Systems" (PASE), replace an immobilizer and also enable the vehicle to be started without actuating a mechanical ignition lock. Vehicle drivers who now only have to carry a (radio) key fob but no longer have to operate it mechanically find this passive form of access very convenient. Furthermore, PASE systems can also be designed so that additional conditions have to be met for a starting operation, such as for example the determination of the identity of the driver, e.g. by using biometric data.

However, a passive access authorization control system can be intercepted or outwitted with intent to misuse. If, for example, the authorized user has moved from his vehicle, an unauthorized person can, by means of an attack on the radio channel, gain access to the vehicle located away from the authorized user. For "Full-duplex attacks", as they are known, also referred to in the following as VDA attacks, the attacker places transceiver devices in the vicinity of both the code transmitter and the vehicle. The code transmitter is interrogated by a data transmission of the transmitter and receiving devices and a code of the radio key is transmitted via the extended radio channel to the vehicle. An access control system that does not detect the improperly extended radio channel length releases the object if for example the authorized vehicle driver is not within the detection range of the transceiver device of the vehicle. The vehicle driver does not notice the VDA attack.

To prevent such misuse, various types of radio-based access control systems are known that, in addition the verification of the key code, also measure the channel length of the radio transmission path and prevent access to the object in the event of improper extension. Methods and systems from radar engineering are known for measuring the channel length.

From DE 100 54 180 A1, such a system for measuring a channel length is known, whereby a base station transmits an interrogation signal to a transponder and in the transponder this is directly modulated upon a carrier signal with a frequency different from that of the interrogation signal. The transponder transmits a response signal back to the base station, from which a comparison signal is split off and the actual channel length determined by a phase comparison or by measuring a time difference using the Frequency Modulated (FM) radar principle.

An anti-theft system for vehicles is known from DE 199 57 536 A1, whereby a transceiver unit transmits a wideband modulated radar signal and awaits an echo signal from a code transmitter. If a code transmitter is within the detection range of the system, it receives this interrogation signal then transmits back an additional modulated and coded response signal. An evaluation unit in the base station in the vehicle analyzes all received response signals, not just with regard to the authorization of the code transmitter but also with regard to the distance between the code transmitter and the vehicle.

A convenient passive access control system whereby utilization is enabled in stages according to the position of the code transmitter is disclosed in DE 100 64 141 A1. Position determination takes place similar to the Frequency-Modulated Continuous-Wave method (FMCW) known from radar engineering. If the response signal of the code transmitter is shown to be authorized, then different control commands, depending on the position of the code transmitter, are used to switch the different functional stages for the utilization of the vehicle. The vehicle can thus be individually matched to the driver. Only when the driver is close to the vehicle is the code transmitter verified in the vicinity of the vehicle and the central locking system released if there is agreement. The vicinity is detected by proximity sensors on the vehicle.

With this known principle of FMCW radar remote identification, a wideband modulated interrogation signal is transmitted to determine the distance of a transceiver device. Normally, the interrogation signal is made up of frequency ramps (up- and down-chirp) and the response signal reflected from the transponder is converted to a frequency position by using an auxiliary carrier, so that the useful signal can be reliably distinguished from the reflections of the environment. A high resolution of the FMCW radar range measurement requires a large bandwidth, i.e. a large deviation in the frequency ramp. Although FMCW frequencies or bandwidths are, for example, allocated or limited by the Industrial-Scientific-Medical (ISM) radar band, an FMCW radar remote identification offers effective protection against VDA attacks by measuring the channel length.

However, all known access control systems using channel length measurement fail if the system is deceived by simulating a radio key in the vicinity. For example, an attack scenario is conceivable where an unauthorized person in a first step deceives the system by simulating a (valid) radio key of the system in the vicinity of the vehicle and then in a second step transfers the correct code to the base station. An access control system that evaluates the distance information and code information of the radio key separately can thus be defeated.

This possibility of defeat is unacceptable for a vehicle access control system that is required to have a high degree of security.

Vehicle access control systems must also be able to function reliably over a long service life and be suitable for manufacture at reasonable cost.

SUMMARY OF THE INVENTION

The object of the invention is to provide a device and a method for access authorization control with improved security.

The object can be achieved by an access control system for an object, particularly a vehicle, comprising at least one base station with a transceiver device that transmits a wideband modulated interrogation signal, at least one transponder that has a modulation device, in order to modulate an auxiliary carrier signal, the frequency of which is re-keyed between a finite number of frequency positions, onto an interrogation signal received at a distance from the base station, and reflect it as a code-modulated response signal, and an evaluation device that is connected downstream from the transceiver device and that evaluates the response signal in sidebands of the keyed frequency positions with regard to code and distance.

The code signal can be a binary data signal and the modulation device can be a two-frequency keying device that changes the frequency of the auxiliary carrier signal between two frequency positions. The evaluation unit may contain a Fourier transformation device for transforming the response signal. The Fourier transformation device can be set up according to the fast (FFT) or discrete (DFT) Fourier transformation method, or in accordance with the Görtzel signal processing method. The evaluation unit may only generate an enable signal if the code information agrees with a stored set code information and the determined distance is less than a predeterminable distance threshold. The interrogation signal can be a wideband modulated radar signal with a bandwidth greater than 60 MHz, with a center frequency in the 2.5 GHz, 5.8 GHz or 24 GHz range being particularly preferred. The transponder can be formed as an active or passive transponder.

The object can also be achieved by a method for operating an access control system for a vehicle that comprising the following steps:

transmitting a wideband modulated interrogation signal from at least one base station;

receiving the interrogation signal by at least one transponder located at a distance from the base station, modulating the interrogation signal, in a modulation device, by a carrier signal, whose frequency is changed in the modulation device in relation to a code between a finite number of frequency positions, and reflected the modulated interrogation signal as a code-modulated answer signal, and evaluating, in at least one base station, the response signal in sidebands of the changed frequency positions in an evaluation unit with respect to code and distance.

A two-frequency keying may take place in the modulation device and the code and distance can be determined from the first and second frequency band of the response signal. The response signal in the frequency bands can be evaluated by a Fourier transformation algorithm, particularly preferably by a fast (FFT) or discrete (DFT) Fourier transformation algorithm or according to the Görtzel signal processing method. The evaluation unit may generate an enable signal only if the evaluation of the sidebands shows that the code information agrees with the stored set code information and the determined distance is less than a predeterminable distance threshold. The interrogation signal can be formed from a series of up-chirp ramps and down-chirp ramps rising and falling essentially in a monotone. The time duration of an up-chirp ramp and the time duration of a down-chirp ramp can be selected to be of equal magnitude. The chosen time duration can be greater than 1 $\mu$s and less than 100 milliseconds. The interrogation signal can be transmitted intermittently until a response signal is received from a code transmitter. The interrogation signal can be transmitted as a wideband modulated radar signal with a bandwidth of more than 60 MHz, with a center frequency in the 2.5 GHz, 5.8 GHz or 24 GHz range being particularly preferred. The code can be divided into data packets and parts of the code are transmitted from the code transmitter to the base station depending on the spacing. The transmission of the code may take place at a data rate that is less in an area distant from the base station than in an area close to the base station. The code can be transmitted encrypted. The transmission of the code can be manually triggered by an actuating device on the code transmitter.

The main aspect of the solution proposed in accordance with the invention is the intercrossed evaluation of the code information and distance information. The intercrossing between the code information and distance information is achieved in that during the evaluation in the base station the sidebands of a code frequency-modulated response signal are simultaneously evaluated with regard to both the code and the distance. In each of the information states given by the coding, a registration of the information state on the one hand and a determination of the channel length on the other are therefore performed. The modulation of the code takes place in the transponder, in that an auxiliary carrier signal is shifted to a finite number m of frequency positions and this modulation product is modulated onto the received interrogation signal. This m frequency-shift keying, also known as m-Frequency Shift Keying modulation, abbreviated as m-FSK, is a known method of digital modulation. By means of this modulation method, a reflection signal is produced, the spectrum of which is made up of a complete number m of frequency positions of the auxiliary carrier signal, each with associated sidebands. The methods of the FMCW radar engineering mentioned in the introduction are available for determining distance information from these sidebands. The center frequency of each keyed frequency position is chosen so that adjacent frequency bands do not cause interference, i.e. even at a great distance and at maximum possible frequency error, which for example could be caused by component tolerances and/or frequency drift of the oscillator assembly, and thus do not lead to an overlapping of adjacent sidebands.

In accordance with the invention, the device for access authorization control includes the following:

At least one base station with a transceiver device that transmits a wideband modulated interrogation signal.

At least one transponder that has a modulation device, in order to modulate an auxiliary carrier signal, the frequency of which is changed between a finite number of frequency positions, onto an interrogation signal received at a distance from the base station and reflect it as a code-modulated response signal.

An evaluation device connected after the transceiver device that evaluates the response signal in sidebands of the keyed frequency positions with regard to code and distance.

The device in accordance with the invention thus consists essentially of at least one transponder that in a detection area is interrogated by a suitable interrogation signal and then reflects a modulation product that, in sidebands of the particular re-keyed frequency position contains both the code information and the distance information, and of at least one evaluation device that simultaneously extracts the code and performs a distance measurement from these sidebands.

In that the base station also carries out the distance measurement during the receipt of the m-FSK modulated code, both sets of information are crossed into each other. This intercrossing between the cryptic information (radio key code) and the physical measured variable (distance between the transponder and base station) is also maintained during the demodulation in the base station. This intercrossing increases security, because a VDA attack that merely simulates the distance information and supplies the code separately is detected by the access control system as an attack and does not lead to an enabling of an access function to the object.

For the m-FSK modulation of the auxiliary carrier signal, various methods are known to the person skilled in the art, such as direct FSK modulation, crystal drawing, using a PLL or by using several crystals. The channel length measurement can be carried out by the devices and methods of FMCW remote identification named in the introduction.

An essential advantage of the invention can be seen in that, apart from the assemblies required for coding and distance measurement, no additional communication or VDA defense assemblies are required for the VDA defense measures in accordance with the invention, either in the code transmitter or in the base station; the basic information for the evaluation in accordance with the invention is inherent in the response signal. Known methods or assemblies can be used for evaluating the response signal. The constructive design of the base station is therefore comparatively simple. These advantages are particularly useful for an access control system used under the rugged operating conditions in a vehicle where a high system reliability is required. The system is very suitable for manufacture, which is of crucial importance for large series production.

To defeat the control system in accordance with the invention requires an incomparably higher technical cost on the part of the attacker. The interlinking signal relationships of the evaluation are not easily detectable externally and the hardware is difficult to realize. Knowledge of the functioning cannot be obtained simply by intercepting the radio channel. In automotive engineering, this increased cost that would be necessary by the attacker is regarded as sufficient security for the defense of a vehicle against a VDA attack.

In a preferred form of embodiment, the access control system has a code transmitter with a two-frequency re-keying device. The two-stage frequency shifting enables 2-FSK modulation methods to be used on available system components for the modulation of a present binary code. By means of the 2-FSK modulation, two keyed frequency position with two sidebands each are produced in the response spectrum. The frequency position contains the information on the logic state of the code signal. For example, from the unmodulated auxiliary carrier it can be seen that an upper frequency position is assigned logic "1" and a lower frequency position is assigned logic "0". The information on the channel length is present in the sidebands in each of these two frequency positions. Therefore, the response signal can be used simultaneously in the base station for extracting the code of the radio key and for determining the distance.

The maximum power draw for a base station, supplied from a vehicle battery, is limited. From the point of view of the vehicle manufacturer, an average power draw of a maximum of 300 to 1000 mA is seen as advantageous. These limitations in the power draw restrict the computing power in the base station. The use in the base station of Fourier transformation devices that operate according to the method of fast (FFT), discrete (DFT) or Görtzel signal processing methods is advantageous.

It is also advantageous with regard to efficient energy consumption if the interrogation signal is transmitted only at limited interrogation intervals. The transponder, that is usually supplied from an auxiliary battery, is advantageously operated in a standby mode, i.e. the code-modulated response signal is reflected only in response to an interrogation at limited response intervals.

In accordance with the invention, a method for operating an access control system for a vehicle has the following procedural steps:

A wideband modulated interrogation signal is transmitted from at least one base station.

The interrogation signal is received by at least one transponder located at a distance from the base station and, in a modulation device, is modulated by a carrier signal whose frequency is changed in a modulation device in relation to a code between a finite number of frequency positions and then reflected as a code-modulated signal.

In at least one base station, the response signal in sidebands of the keyed frequency positions is evaluated with regard to code and distance.

The base station then generates an enable signal for an access function only if the code information agrees with a preset set code information and the determined distance is below a predetermined threshold value. In this way, it is possible to define position areas around the vehicle in which access functions up to the immediate vicinity can be enabled only in steps.

It is advantageous if the interrogation signal is formed from a sequence of up-chirp ramps and down-chirp ramps essentially rising and falling in monotone.

When determining the distance information, it is advantageous if the time duration of an up-chirp ramp and the time duration of a down-chirp ramp are chosen to be of equal magnitude.

With regard to the energy consumption of the digital signal processing assemblies, it is advantageous if the time duration of these up-chirp or down-chirp ramps is greater than 1 $\mu$s and less than 100 milliseconds.

The radio dialog can be further improved with regard to energy consumption if the base station transmits the interrogation signal intermittently. A transponder allocated to the base station generates the code-modulated response signal only when it is interrogated by this intermittent interrogation.

In order to be able to perform a distance measurement in the immediate vicinity of a vehicle with the necessary accuracy, it is advantageous if the interrogation signal is transmitted as a wideband modulated signal with a bandwidth greater than 60 MHz, with a center frequency in the 2.5 GHz, 5.8 GHz or 24 GHz range being particularly preferred.

Wideband in this case means that the frequency of the FMCW interrogation signal varies within a relatively large frequency band during transmission and is demodulated on reception. This is in contrast to the typical modulation whereby modulation and demodulation take place at a fixed carrier frequency.

It is also advantageous if in the radio channel the code information of the code transmitter is transmitted to the base station in the form of data packages. In this way, sensitive parts of the code can be transmitted at different intervals. It is, for example, conceivable that the data communication between the transponder and base station is prepared in a first step from an outer position area. In a second step, when the radio key is in the immediate vicinity, e.g. within a distance of one meter of the vehicle, the security-critical information is transmitted. The requirements regarding the capacity of the transmission channel are corrected in this way. A radio key code consisting of several hundred bits can thus be securely transmitted in less than one second.

The code transmitter can also be designed so that simple control information, such as for example a remote keyless entry control function, can be transmitted by the user to the vehicle without further synchronization measures. By means of this additional functionality with a passive access control system, as shown in the introduction, no action is required by the vehicle driver. If the PASE system fails, the central locking system can simply be manually operated, e.g. by an actuating button on the radio key.

BRIEF DESCRIPTION OF THE DRAWINGS

The object of the invention is further explained by means of the following drawings. These are as follows:

FIG. 1 A block diagram of a form of embodiment of the access control system in accordance with the invention.

FIG. 2a A flow diagram showing the evaluation of the response signal according to prior art.

FIG. 2b A flow diagram showing the evaluation of the response signal according to the invention.

FIG. 3 A spectral representation of a 2-FSK code-modulated interrogation signal.

DETAILED DESCRIPTION OF THE PREFERRED EMBODIMENTS

FIG. 1 is a block diagram showing an example of the implementation of an access control system I in accordance with the invention. It consists of an interrogation unit or base station (BS) 20 and an allotted transponder or code transmitter (CID) 30. An access control system for a vehicle can consist of several of these units. The base station 20 is usually mounted in the vehicle. The code transmitter 30 is carried by the vehicle driver and can be designed as a chipcard or portable radio key. Control of the authorized utilization or access to the vehicle takes place by means of a data dialog that is carried out in a radio channel 4 between the base station 20 and identification transmitter 30. The object of this data exchange is on the one hand to identify the radio key 30 and on the other hand to determine its actual position relative to the vehicle. Provided the system can identify the code transmitter 30 for authorized use and this code transmitter is identified as located within a predetermined position area, the control system 1 enables access functions to the vehicle. Otherwise, access to the vehicle is prevented. The enabling of access functions can take place in stages in that enable signals that are fed to different actuators, for example the central locking, are generated by the base station.

The base station 20 contains a transmitter signal source (S1) 21, that generates a signal Sig1 and radiates it via the transmitting antenna 22 as an FMCW interrogation signal 2. This signal Sig1 is wideband modulated. The characteristic of this signal Sig1 consists of constant parts of up-chirp and down-chirp frequency ramps rising and falling in monotone. In the radio channel 4, the interrogation signal 2 reaches the receiving antenna 32 of the code transmitter 30 with a reduced amplitude after the signal propagation time.

The signal Sig2 received at antenna 32 is applied to a modulation device MOD. The modulation device MOD consists of a first modulator stage MOD1 and a second modulator stage MOD2.

In the second modulator stage (MOD2) 34, an auxiliary carrier signal SigHT of an auxiliary carrier signal source S2 is modulated with a code signal SigCI of a code source CI. By means of the evaluation in the base station shown below, the modulation with the auxiliary carrier signal enables the reflected signal from the transponder to be distinguished from passive reflections of the environment. The code source CI can be a storage device containing set code information. Using this stored code information, a base station can identify a transponder CID from a distance by means of radio interrogation. The code information does not, however, have to be stored as a set code in the CD transmitter, but instead can also be the result of a cryptic data dialog between the base station and transponder. In this case, the code is the result of an encrypted data dialog between these communication partners. In both cases, the modulation result of the second modulator stage MOD2 is a coded auxiliary carrier signal SigCHT, whose frequency is re-keyed between a finite number m of frequency positions relative to code CI. The signal SigHT is switched to an input of the first modulator stage MOD1.

In a first modulator stage MOD1, the coded auxiliary carrier signal SigCHT is modulated onto signal Sig2 received from antenna 32. The modulation result of the modulator stage MOD1 is a code-modulated interim signal Sig3 that is applied to the transmitting antenna 33 of the code transmitter 30. The code-modulated response signal 3 is transmitted from the transmitting antenna 33 and, after the signal propagation time in radio channel 4, reaches antenna 23 of the base station 20 with reduced amplitude. The signal Sig4 contains the sidebands in each of the changed frequency positions. The signal Sig4 received by the antenna 23 is fed, together with the signal Sig1 branched off from the signal source 21 by a direction coupler or power divider 25, to an evaluation unit (AE) 24.

In accordance with the basic concept of the invention, the distance is measured and the code transmitted simultaneously. For this purpose, there are known methods of digital demodulation or FMCW radar signal processing technology available to the person skilled in the art.

The signal processing in the evaluation unit 24 can take place in analog and/or digital form and it can be realized by hardware, firmware or software.

In the case of digital signaling processing, the evaluation can take place at the lower scanning rate with regard to the code compared with the distance measurement.

In the block diagram in FIG. 1, separate antennas, 22, 23, 32, 33 are provided in each case for reception and transmission in the base station 20 and in the code transmitter 30. By using a circulator or quasi-circulator, e.g. a direction coupler, only a single antenna can be formed at the base station 20 or code transmitter 30 in each case.

The code transmitter 30 can be designed as a passive reflector (backscatter) or as an active reflector with a transmitter unit.

FIG. 2a is a schematic illustration of the process of signal evaluation for known access control systems. The distance information E and the code information C are determined from the response signal in evaluation segments ta separated by time.

FIG. 2b on the other hand is a schematic showing the process of signal evaluation in accordance with this invention. The distance is measured during the transmission of the code. Both sets of information, the distance E and code C, are present simultaneously in the evaluation intervals ta. They are shown superimposed in the diagram, which illustrates the intercrossing during the evaluation of the sidebands in accordance with the invention.

FIG. 3 shows the spectrum of a 2-FSK code-modulated response signal. In the diagram, signal amplitude A is shown over frequency f. The transmission of the code information from the transponder to the base station takes place in two frequency positions F"0" and F"1" formed by changing the auxiliary carrier frequency fHT. In the example shown, the keying in the lower frequency position F"0" corresponds to the transmission of a logic zero; the keying in the upper frequency position F"1" to the transmission of a logic one. Each of the two keyed frequency positions fHT"0" and fHT"1" consists of an upper and lower sideband. The lower sidebands spectrally up-chirp or down-chirp, at modulation "0" or modulation "1" respectively.

The unmodulated auxiliary carrier is shown in FIG. 3 by a broken line and does not necessarily have to be transmitted.

The code evaluation takes place in such a way that each keyed frequency position is regarded as a decision window for an information state. If the signal is present or not present in the decision window, this corresponds to either a logic zero or logic one respectively.

The distance evaluation takes place corresponding to the FMCW radar technique, whereby the sidebands in each decision window are evaluated by forming frequency differences between the interrogation signal Sig1 and response signal Sig4. The differential frequency ? f between two frequency lobes (shown schematically in the illustration as arrows in the sideband) is proportional to the distance between the base station and transponder, and thus to the length of the radio channel. If, for example the distance between the base station and code transmitter reduces, the frequency separation ? f also reduces during the transmission of a logic zero or logic one. The decisive factor for the invention is that the distance information ? f is evaluated in each frequency position of the auxiliary carrier. In this example of an embodiment of the 2-FSK, this is the frequency position F"0" or the frequency position F"1".

In the case of m frequency keying, an infinite number m of information states, and thus m frequency positions, exist. These m frequency positions would be below or above the frequency positions fHT"0" or fHT"1" in the spectrum in FIG. 3, but these frequency positions are not shown in FIG. 3. In accordance with the invention, an evaluation also takes place in the case of the m-FSK in each of the m frequency positions both with regard to the code and the distance information.

In accordance with the invention, the distance information is coupled with the transmission of the "bit information" during the evaluation. This intercrossing between distance and code information is also retained during the demodulation. The intercrossing offers an increased protection against an extended VDA attack detailed in the introduction.

Of course, the invention is not limited to use in vehicles, but can also be used for buildings, computers or other electronic equipment or systems.

We claim:
1. An access control system for an object, particularly a vehicle, comprising:
   At least one base station with a transceiver device that transmits a wideband modulated interrogation signal,
   At least one transponder that has a modulation device, in order to modulate an auxiliary carrier signal, the frequency of which is re-keyed between a finite number of frequency positions, onto an interrogation signal received at a distance from the base station, and reflect it as a code-modulated response signal, and
   An evaluation device that is connected downstream from the transceiver device and that evaluates the response signal in sidebands of the keyed frequency positions with regard to code and distance.
2. The access control system in accordance with claim 1, wherein the code signal is a binary data signal and the modulation device is a two-frequency keying device that changes the frequency of the auxiliary carrier signal between two frequency positions.
3. The access control system in accordance with claim 1, wherein the evaluation unit contains a Fourier transformation device for transforming the response signal.
4. The access control system in accordance with claim 3, wherein the Fourier transformation device is set up according to the fast (FFT) or discrete (DFT) Fourier transformation method, or in accordance with the Görtzel signal processing method.
5. The access control system in accordance with claim 1, wherein the evaluation unit only generates an enable signal if the code information agrees with a stored set code information and the determined distance is less than a predeterminable distance threshold.
6. The access control system in accordance with claim 1, wherein the interrogation signal is a wideband modulated radar signal with a bandwidth greater than 60 MHz, with a center frequency in the 2.5 GHz, 5.8 GHz or 24 GHz range being particularly preferred.
7. The access control system in accordance with claim 1, wherein the transponder is formed as an active or passive transponder.
8. A method for operating an access control system for a vehicle that comprising the following steps:
   transmitting a wideband modulated interrogation signal from at least one base station;
   receiving the interrogation signal by at least one transponder located at a distance from the base station,
   modulating the interrogation signal, in a modulation device, by a carrier signal, whose frequency is changed in the modulation device in relation to a code between a finite number of frequency positions, and
   reflected the modulated interrogation signal as a code-modulated answer signal, and
   evaluating, in at least one base station, the response signal in sidebands of the changed frequency positions in an evaluation unit with respect to code and distance.
9. The method in accordance with claim 8, wherein a two-frequency keying takes place in the modulation device and the code and distance are determined from the first and second frequency band of the response signal.
10. The method in accordance with claim 8, wherein the response signal in the frequency bands is evaluated by a Fourier transformation algorithm, particularly preferably by a fast (FFT) or discrete (DFT) Fourier transformation algorithm or according to the Görtzel signal processing method.
11. The method in accordance with claim 8, wherein the evaluation unit generates an enable signal only if the evalu- ation of the sidebands shows that the code information agrees with the stored set code information and the determined distance is less than a predeterminable distance threshold.

12. The method in accordance with claim 8, wherein the interrogation signal is formed from a series of up-chirp ramps and down-chirp ramps rising and falling essentially in a monotone.

13. The method in accordance with claim 12, wherein the time duration of an up-chirp ramp and the time duration of a down-chirp ramp are selected to be of equal magnitude.

14. The method in accordance with claim 13, wherein the chosen time duration is greater than 1 $\mu$s and less than 100 milliseconds.

15. The method in accordance with claim 8, wherein the interrogation signal is transmitted intermittently until a response signal is received from a code transmitter.

16. The method in accordance with claim 8, wherein the interrogation signal is transmitted as a wideband modulated radar signal with a bandwidth of more than 60 MHz, with a center frequency in the 2.5 GHz, 5.8 GHz or 24 GHz range being particularly preferred.

17. The method in accordance with claim 8, wherein the code is divided into data packets and parts of the code are transmitted from the code transmitter to the base station depending on the spacing.

18. The method in accordance with claim 17, wherein the transmission of the code takes place at a data rate that is less in an area distant from the base station than in an area close to the base station.

19. The method in accordance with claim 17, wherein the code is transmitted encrypted.

20. The method in accordance with claim 17, wherein the transmission of the code is manually triggered by an actuating device on the code transmitter.

* * * * *